United States Patent
Gustafson et al.

(10) Patent No.: US 8,204,850 B1
(45) Date of Patent: Jun. 19, 2012

(54) CONTEXTUAL REPORT DEFINITION CREATOR

(75) Inventors: Paul Gustafson, Moraga, CA (US); Jon Ruggiero, Walnut Creek, CA (US); Nick Pouschine, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 285 days.

(21) Appl. No.: 12/455,806

(22) Filed: Jun. 4, 2009

(51) Int. Cl.
*G06F 17/30* (2006.01)

(52) U.S. Cl. ........................................ 707/603

(58) Field of Classification Search ............ 707/603, 707/706, 803, 805; 715/222, 243
See application file for complete search history.

(56) References Cited

U.S. PATENT DOCUMENTS

| | | | | |
|---|---|---|---|---|
| 6,397,207 B1* | 5/2002 | Bleizeffer et al. | | 1/1 |
| 7,143,107 B1* | 11/2006 | Nebres, Jr. | | 707/603 |
| 7,315,853 B2* | 1/2008 | Brunswig et al. | | 1/1 |
| 7,584,425 B2* | 9/2009 | Nader et al. | | 715/255 |
| 7,971,148 B2* | 6/2011 | Papakonstantinou et al. | | 715/762 |
| 2002/0138636 A1* | 9/2002 | Buttner et al. | | 709/229 |
| 2003/0040936 A1* | 2/2003 | Nader et al. | | 705/1 |
| 2005/0278282 A1* | 12/2005 | Sheridan | | 707/1 |
| 2006/0048053 A1* | 3/2006 | Sembower et al. | | 715/517 |
| 2006/0069628 A1* | 3/2006 | Le et al. | | 705/28 |
| 2007/0162371 A1* | 7/2007 | Delf, Jr. | | 705/35 |
| 2007/0233680 A1* | 10/2007 | Carlson et al. | | 707/7 |
| 2007/0256006 A1* | 11/2007 | Meyers | | 715/511 |

* cited by examiner

*Primary Examiner* — Cam-Linh Nguyen
(74) *Attorney, Agent, or Firm* — Van Pelt, Yi & James LLP (57) ABSTRACT

A system for defining a report comprises a processor and a memory. The processor is configured to retrieve a set of fields associated with a received indication of a familiar data instance; retrieve a set of report data sources, wherein the set of report data sources is associated with one or more fields selected from a set of fields associated with the familiar data instance; and define a report using a selected report data source from the set of report data sources. The memory is coupled to the processor and is configured to provide the processor with instructions.

33 Claims, 12 Drawing Sheets

Employee

| | |
|---|---|
| Name | John Vest |
| Title | Engineering Manager |
| Salary | $200,000 |
| Division | Fabrication |
| Manager | Sally Jackson |
| Location | Walnut Creek |
| Birthdate | 10/12/1962 |
| Languages Spoken | English, Spanish |

CONTEXTUAL REPORT DEFINITION CREATOR

BACKGROUND OF THE INVENTION

Users of an enterprise business software system expect the system to provide for them a rich set of functionality. For example, a finance system is expected to prepare paychecks, prepare tax returns, create end of the year reports, etc. A personnel system is expected to prepare reports of personnel sorted or categorized in various ways, to process the hiring of employees, etc. In addition to the functionality built into the enterprise business software, users expect the software to be extensible and modifiable. Many typical business processes differ significantly in their details from company to company, and the enterprise software needs to be modified by the user to meet his company's needs. A given user therefore typically desires functionality that is not built into the enterprise software system. Additionally, users also typically desire to add custom reporting capabilities to support their day-to-day information gathering and decision making needs.

An enterprise business software user designing a custom report is confronted with a wide selection of data objects (e.g., employees, contractors, suppliers), data fields (e.g., age, salary, manager, etc.), and means of filtering the data. Because systems with many kinds of data objects and data fields often have difficulty uniquely identifying the data objects and data fields to a user, users unfamiliar with the specific terminology of the enterprise software system for different data objects and fields will likely have a difficult time creating their desired reports.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A contextual report definition creator is disclosed. The contextual report definition creator receives an indication of a familiar data instance from a user desiring to create a report. In response to the indication of a familiar data instance, the contextual report definition creator retrieves a set of fields associated with the familiar data instance and presents a display of the set of fields to the user desiring to create a report. The contextual report definition creator then receives a selection of one or more fields from the display of the set of fields. After the selection of one or more fields has been received, the contextual report definition creator retrieves a set of report data sources associated with the familiar data instance and presents a display of the set of report data sources to the user desiring to create a report. A selection of a report data source is then received from the display of the set of report data sources. The contextual report definition creator creates a report based on the received information. In various embodiments, the contextual report definition creator also receives one or more of the following: report sorting rules, report filtering rules, report prompts, a report security policy, or any other appropriate information for report creation.

The contextual report creator is implemented on an application server connected to a network. The contextual report creator comprises software for contextual report creation along with network communication hardware for communicating with users (e.g., a report designer, a report user) accessing the network from different points.

In some embodiments, a user uses a contextual report definition creator to create a report. The report is created after searching out data associated with the report. For example, a report is desired regarding salaries of engineers, so a user navigates to a display with a salary of an engineer. The user selects creating a report from a related action menu. The user identifies the salary and the job title fields as relevant information for the report and some other associated data for the report that is also in the display (e.g., data displayed in fields associated with the familiar display with the salary information). The user is also asked to identify a report data source that is associated with the selected fields from a list of retrieved data sources that are associated with the data fields that the user has selected. Since the user is displayed data fields and data sources within a familiar context, the user is able to readily identify the appropriate fields and sources for a report.

Figure 1:
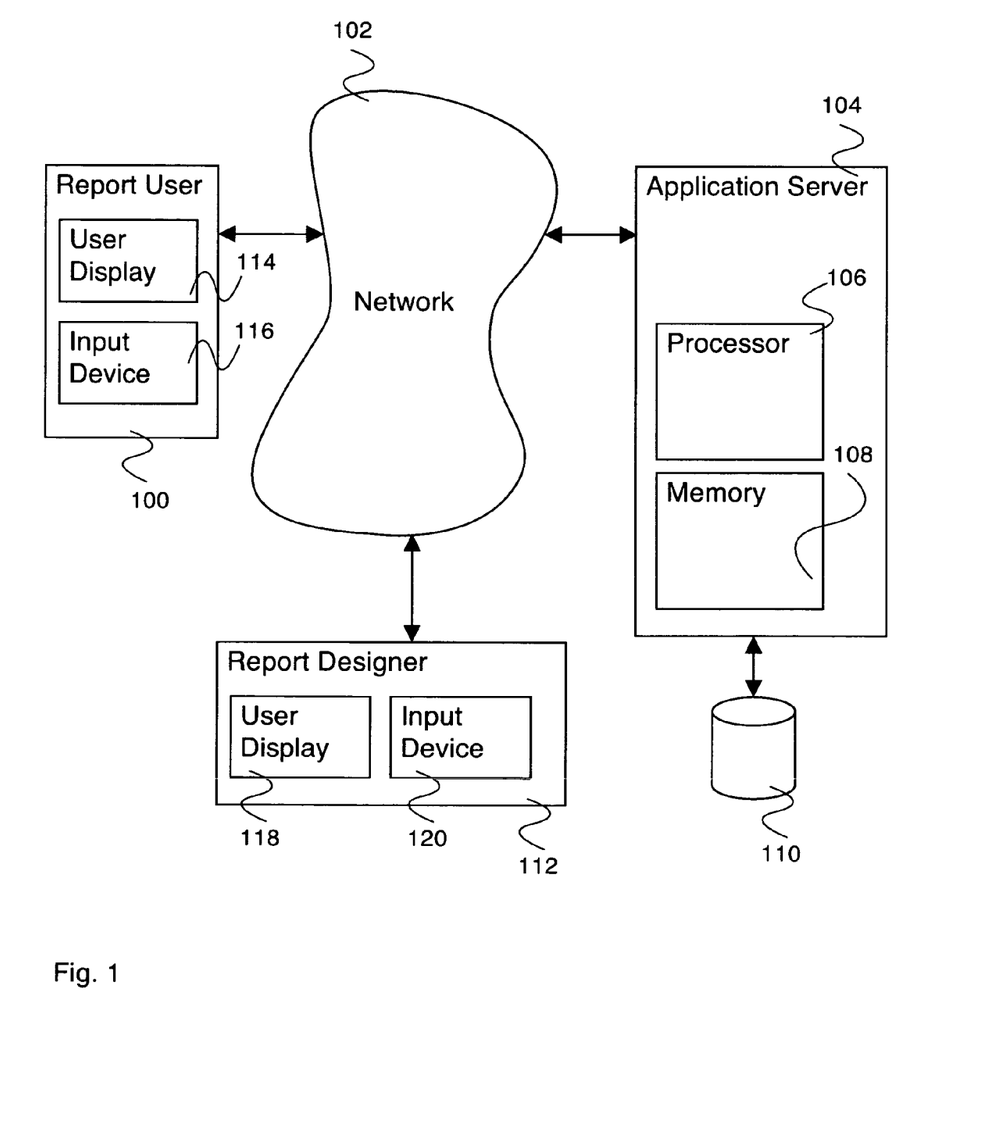
FIG. 1 is a block diagram illustrating an embodiment of a system for a contextual report definition creator.

FIG. 1 is a block diagram illustrating an embodiment of a system for a contextual report definition creator. In the example shown, application server 104 includes processor 106 and memory 108. Application server 104 is coupled to storage device 110 so that application server 104 is able to store information to and access information from storage device 110 (e.g., instructions for a processor that when executed configure the processor to perform a function). Application server 104 is also coupled to network 102. In various embodiments, network 102 comprises one or more of the following: a local area network, a wide area network, a wired network, a wireless network, the Internet, or any other appropriate network. Network 102 enables report user 100 and report designer 112 to access application server 104. In various embodiments, report designer 112 specifies an application stored at least in part in memory 108 that runs on application server 104 using processor 106. Report user 100 accesses the application. The application prepares reports based on stored data. In various embodiments, stored data is related to a business requirement such as an expense report, a personnel file, data related to an employee, or any other relevant data. In various embodiments, the application comprises an enterprise application, a human resources application, a business process application, a finance application, a content management application, or any other appropriate application for which a contextual report definition creator is useful.

In various embodiments, application server comprises one or more physical servers with one or more processors, one or more memories, and one or more other storage devices (e.g., hard drives, array of drives, etc.) and/or one or more virtual environments (e.g., virtualization of operating system or application processes) in which an application is executed.

Report user 100 comprises user display 114 and input device 116. User display 114 comprises a display (e.g., a monitor, a projector, etc.) for displaying information to a user (e.g., a report user). In some embodiments, information displayed to a user includes report data. Input device 116 comprises a data entry device (e.g., a keyboard, a mouse, etc.) for receiving data input from a user. In some embodiments, a user uses input device 116 to indicate that an application stored on application server 104 is to be executed. Application server 104 runs the application chosen by the user and displays the results on user display 114. In some embodiments, the application chosen by the user is a reporting application, and a reporting display is shown on user display 114. The user uses input device 116 to select a report to display (e.g., a personnel report, a facilities report, a salary report, etc.) from the reporting application. Application server 104 then displays the desired report on user display 114.

Report designer 112 comprises user display 118 and input device 120. User display 118 comprises a display (e.g., a monitor, a projector, etc.) for displaying information to a user (e.g., a report creator). In some embodiments, information displayed to a user includes report creation information. Input device 120 comprises a data entry device (e.g., a keyboard, a mouse, etc.) for receiving data input from a user. In some embodiments, a user uses input device 120 to indicate that an application stored on application server 104 is to be executed. Application server 104 runs the application chosen by the user and displays the results on user display 118. In some embodiments, the application chosen by the user is a report creation application, and a report creation display is shown on user display 118.

In some embodiments, the report creation application is executed from within a data reporting application, and the user first selects a familiar data instance of the type to be reported upon (e.g., if a report on engineer salaries is desired, the user selects an engineer instance whose salary is familiar to the user). The user then uses input device 120 to indicate that report creation is to be executed. Application server 104 retrieves a set of fields associated with the familiar data instance and displays the set of fields on user display 118. The user uses input device 120 to select one or more fields from the display of the set of fields. In response to the selection of one or more fields, application server 104 retrieves a set of report data sources associated with the familiar data instance, and presents a display of the set of report data sources to the user desiring to create a report. The user uses input device 120 to select a report data source from the display of the set of report data sources. Application server 104 uses the information received to create a report that can then be executed (e.g., by report user 100). In various embodiments, the user uses input device 120 to select one or more of the following: report sorting rules, report filtering rules, report prompts, a report security policy, or any other appropriate information for report creation.

Figure 2:
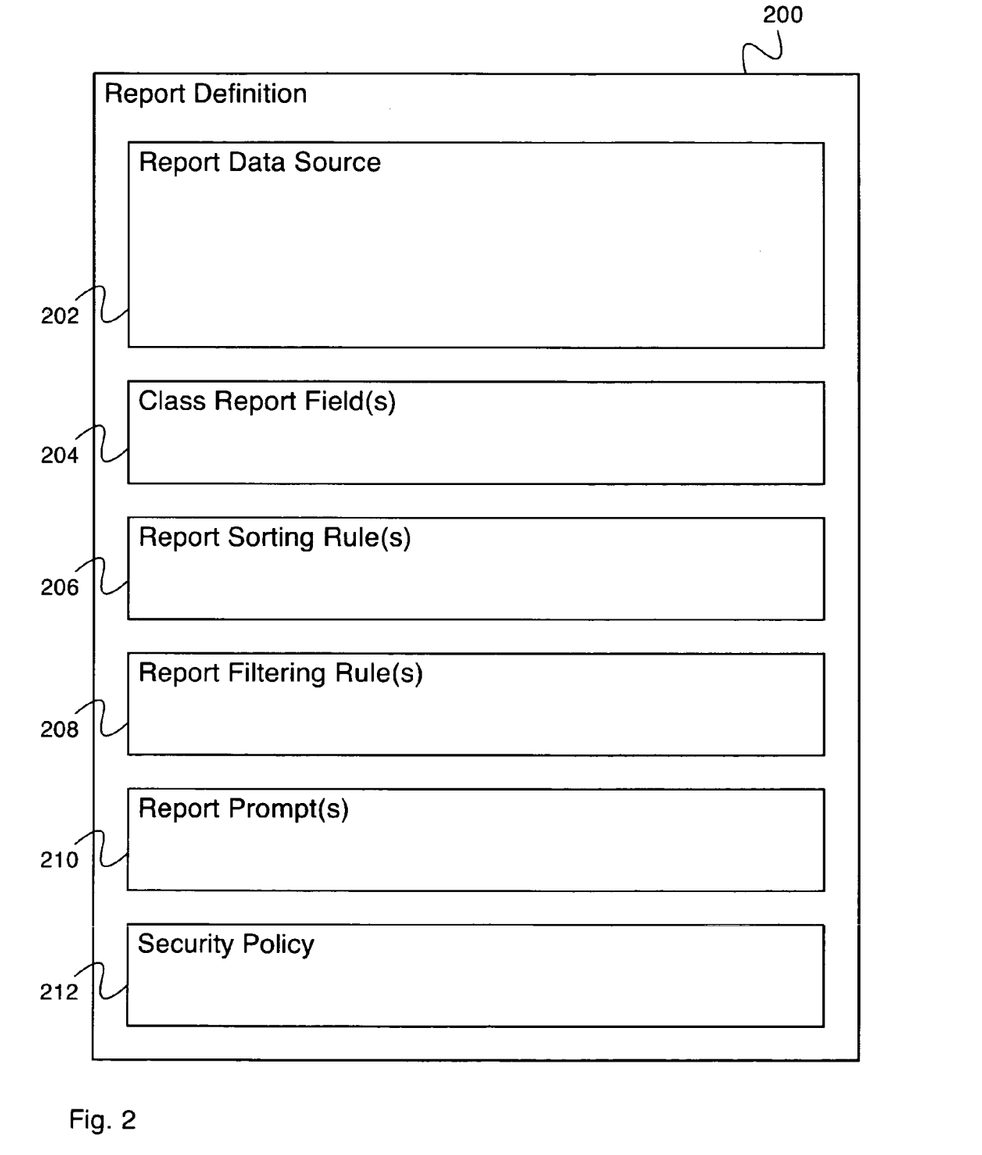
FIG. 2 is a block diagram illustrating an embodiment of a report definition.

FIG. 2 is a block diagram illustrating an embodiment of a report definition. In some embodiments, report definition 200 is prepared by report designer 112 of FIG. 1 and is stored on application server 104 of FIG. 1 (e.g., using memory 108 and/or storage device 110). In some embodiments, report definition 200 is used to create a specific instance of the report, which is accessed by report user 100 of FIG. 1. For example, an engineer's current quarter salary report is run using the engineer's salary report definition to create a Q1 2009 engineer salary report. In the example shown, report definition 200 comprises report data source 202 and class report fields 204. In various embodiments, report definition 200 additionally comprises report sorting rules(s) 206, report filtering rule(s) 208, report prompt(s) 210, and security policy 212. Report data source 202 comprises a data set that is accessed by the report. In some embodiments, report data source 202 comprises a set of instances of a given class (e.g., employees, vendors, business sites, invoices, etc.), each containing a set of class report fields comprising an attribute with a value (e.g., name, salary, position, location, age, etc.). In various embodiments, report data source 202 comprises all instances of the given class, a subset of the instances of the given class defined by a filter, a subset of the instances of the given class defined in some other way, or any other appropriate group of instances of the given class. In some embodiments, the instances in report data source 202 comprise the rows displayed in the report generated by report definition 200. In the example shown, report data source 202 comprises one report data source. In some embodiments, report data source 202 comprises two, four, or any other appropriate number of report data sources. Class report field(s) 204 comprise(s) a subset of the class report fields of the instances of report data source 202. In some embodiments, class report field(s) 204 comprise(s) the columns displayed in the report generated by report definition 200. In various embodiments, class report field(s) 204 comprise one of the class report fields of the instances of report data source 202, all of the class report fields of the instances of report data source 202, a predefined group of the class report fields of the instances of report data source 202, an algorithmically chosen group of the class report fields of the instances of report data source 202, or any other subset of the class report fields of the instances of report data source 202.

Report sorting rule(s) 206 comprise a set of rules for sorting the rows of the report. In some embodiments, report sorting rule(s) 206 comprise one or more predefined rules for sorting the rows of the report. In some embodiments, no report sorting rules are defined, and the rows of the report are sorted according to a default set of rules. Report filtering rule(s) 208 comprise a set of rules for filtering the rows of the report. In some embodiments, report filtering rule(s) 208 comprise one or more predefined rules for filtering the rows of the report. In some embodiments, no report filtering rules are defined, and all rows of the report are displayed. Report prompt(s) 210 comprise a set of prompts presented to the report user when the report is run, comprising parameters of the report filtering rules (e.g., display records after date, display employees with salary above what value, etc.). In some embodiments, one or more report prompts are defined and presented to the user when the report is run. In some embodiments, no report prompts are defined, and the report runs without any user input. Security policy 212 comprises a policy defining which users are allowed to run the report. In various embodiments, security policy 212 comprises a set of users defined by a filter, an explicitly defined set of users, all users, no users, or any other appropriate set of users.

Figure 3:
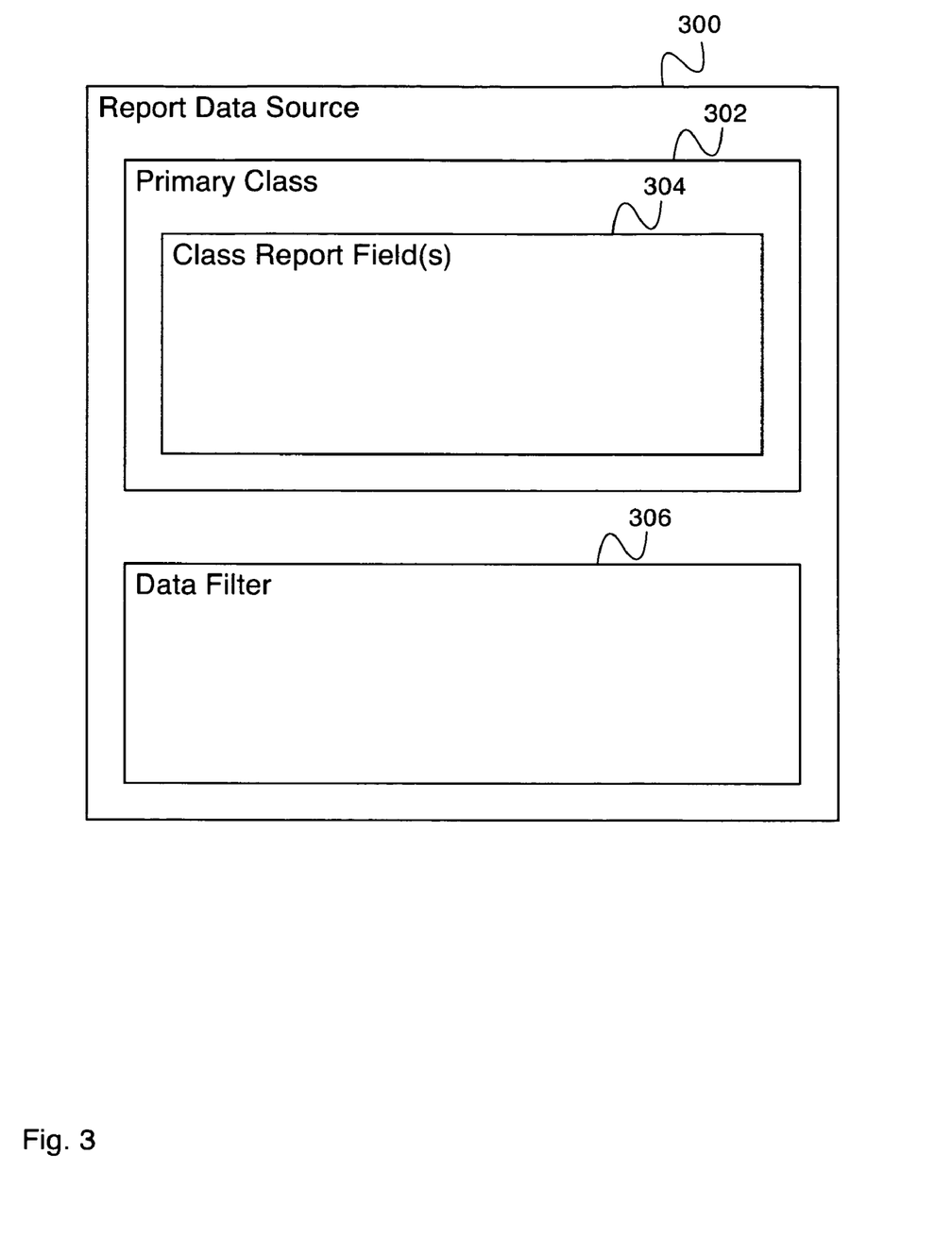
FIG. 3 is a block diagram illustrating an embodiment of a report data source.

FIG. 3 is a block diagram illustrating an embodiment of a report data source. In some embodiments, a report data source comprises a set of data object instances of a given type (e.g., engineers, managers earning more than $200,000 per year, manufacturing workers on the third shift, etc.). In the example shown, report data source 300 comprises a data source for a report. In some embodiments, report data source 300 comprises report data source 202 of FIG. 2. In the example shown, report data source 300 comprises primary class 302 and data filter 306. Primary class 302 comprises an object class for which object instances can exist. Object classes comprise the entity types the database system maintains data on (e.g., employees, vendors, business sites, invoices, etc.). Primary class 302 comprises class report field(s) 304. Class report field(s) 304 comprise(s) one or more fields containing data the class can report. In some embodiments, class report field(s) 304 comprise(s) all of the various stored attributes describing instances of primary class 302. In some embodiments, class report field(s) 204 of FIG. 2 is/are chosen from class report field(s) 304. Data filter 306 comprises a filter on the object instances of primary class 302 that are returned by report data source 300. In some embodiments, the filter tests a value stored in one of class report fields(s) 304 (e.g., return all employees with salary greater than $100,000). In some embodiments, data filter 306 can access global system variables as part of its test (e.g., return all employees who were hired more than one year before today). In some embodiments, data filter 306 can access the current application scope as part of its test (e.g., return all employees who are my subordinates).

Figure 4:
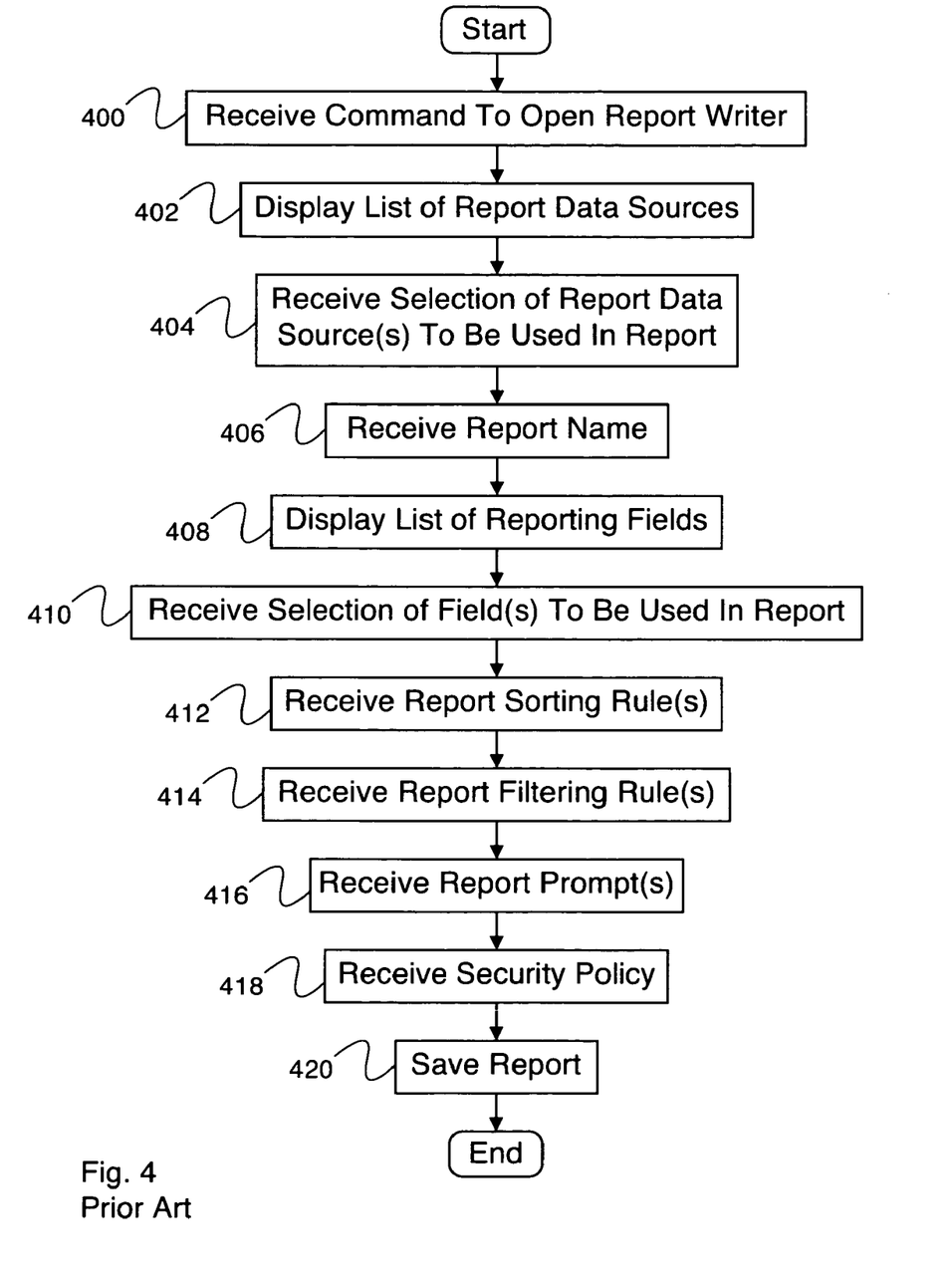
FIG. 4 is a flow diagram illustrating an embodiment of a process for creating a report without a contextual report creator.

FIG. 4 is a flow diagram illustrating an embodiment of a process for creating a report without a contextual report creator. In some embodiments, the report is created by a report designer (e.g., report designer 112 of FIG. 1) and is used by a report user (e.g., report user 100 of FIG. 1), and the report designer is executed using an application server (e.g., application server 104 of FIG. 1). In some embodiments, commands are sent by the report designer using an input device (e.g., input device 120 of FIG. 1), and report creation information is displayed by the application server on a user display (e.g., user display 118 of FIG. 1). In the example shown, in 400, a command is received to open the report writer. In various embodiments, the command to open the report writer is sent by clicking a button or selecting a menu item within the database software application, by running an application separate from the database software application, or by any other appropriate means. In 402, a list of report data sources (e.g., report data source 202 of FIG. 2) is displayed. In some embodiments, the list of report data sources comprises all of the report data sources in the report creation software. In 404, a selection of a report data source or sources to be used in the report is received. Data object instances returned by the report data source will appear as rows in the report when it is executed. Selecting a report data source from the list of all report data sources known to the report creation software is difficult for a report creator because of the large number of report data sources known to the report creation software and because of the difficulty of naming them such that the report creator can easily distinguish them from one another. In various embodiments, the menu of report data sources comprises twenty five report data sources, one hundred and twenty-five report data sources, one thousand two hundred report data sources, or any other appropriate number of report data sources. In some embodiments, the report designer enters the name of the report data source from memory. In 406, a report name is received. In some embodiments, the report user uses the name to identify the report.

In 408, a list of fields (e.g., class report fields 204 of FIG. 2) available to be used in the report is displayed. In some embodiments, the list of fields comprises a list of the class report fields of the primary class (e.g., primary class 302 of FIG. 3) of the report data source selection received in 404. In various embodiments, the list of fields comprises thirty-two fields, one hundred and fifteen fields, one thousand four hundred fields, or any other appropriate number of fields. In some embodiments, the report designer enters the name of the fields from memory. In 410, a selection of field(s) to be used in the report is received. In various embodiments, one or more than one fields are selected to be used in the report. Each field selected will appear as a column in the report when it is executed. In some embodiments, it is difficult for the report designer to select the desired fields from the list of fields due to the difficulty in naming the fields in such a way as to convey their meaning. Field values are not shown, so it can be difficult for the report creator to distinguish similar or related fields (e.g., distinguishing salary, salary with benefits, bonus, retirement benefits, etc.)

In 412, report sorting rule(s) (e.g., report sorting rule(s) 206 of FIG. 2) are received. Report sorting rule(s) comprise a set of rules for sorting the rows of the report. In some embodiments, report sorting rule(s) comprise one or more predefined rules for sorting the rows of the report. In some embodiments, no report sorting rules are defined, and the rows of the report are sorted according to a default set of rules. In 412, report filtering rule(s) (e.g., report filtering rule(s) 208 of FIG. 2) are received. Report filtering rule(s) comprise a set of rules for filtering the rows of the report. In some embodiments, report filtering rule(s) comprise one or more predefined rules for filtering the rows of the report. In some embodiments, no report filtering rules are defined, and all rows of the report are displayed. In 414, report prompt(s) (e.g., report prompt(s) 210 of FIG. 2) are received. Report prompts comprise a set of prompts presented to the report user when the report is run, comprising parameters of the report filtering rules (e.g., display records after date, display employees with salary above what value, etc.). In some embodiments, one or more report prompts are defined and presented to the user when the report is run. In some embodiments, no report prompts are defined, and the report runs without any user input. In 416, a security policy (e.g., security policy 212 of FIG. 2) is received. The security policy comprises a policy defining which users are allowed to run the report. In various embodiments, the security policy comprises a set of users defined by a filter, an explicitly defined set of users, all users, no users, or any other appropriate set of users. In 418, the report is saved, and the process ends.

Figure 5:
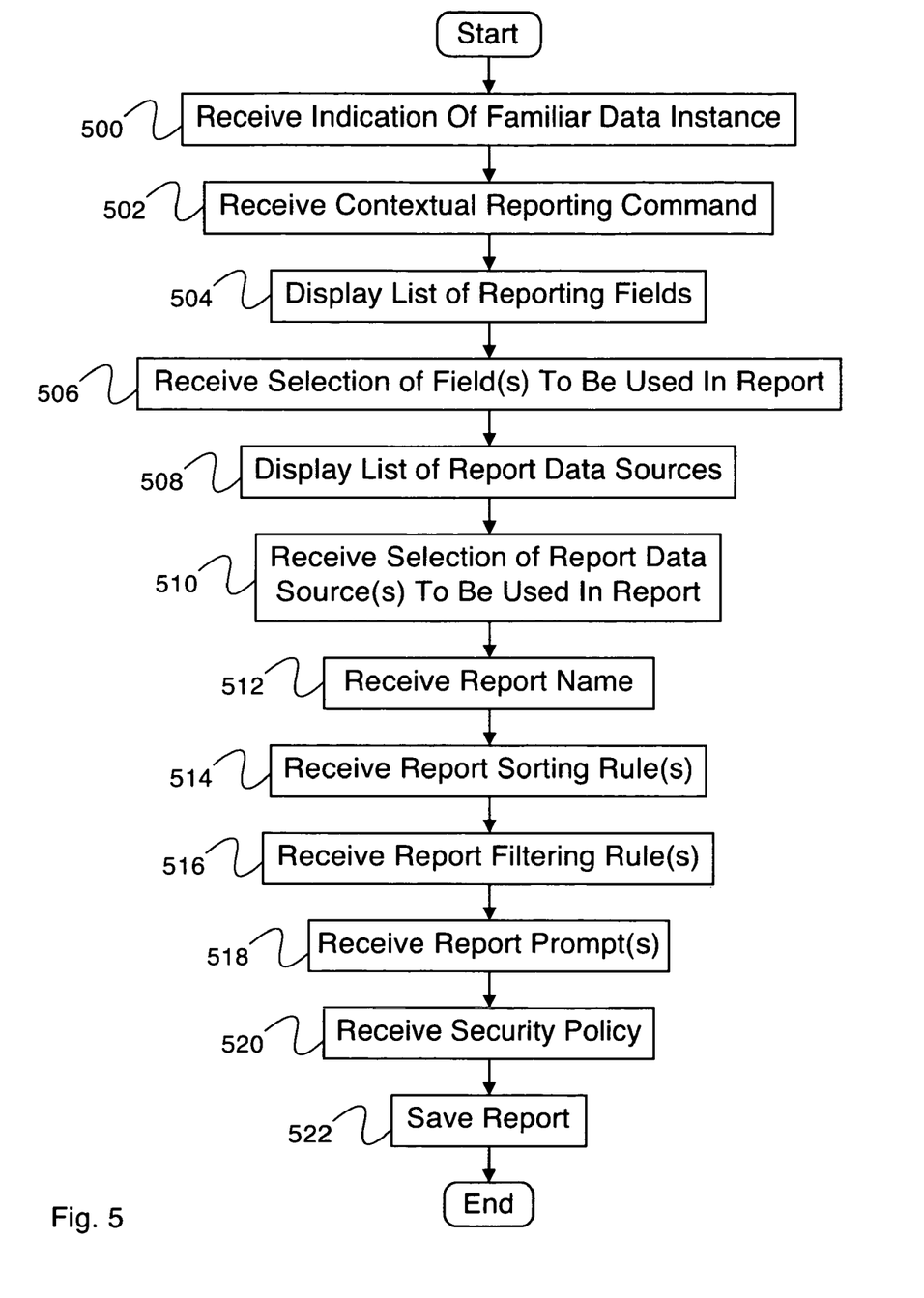
FIG. 5 is a flow diagram illustrating an embodiment of a process for report creation with a contextual report creator.

FIG. 5 is a flow diagram illustrating an embodiment of a process for report creation with a contextual report creator. In some embodiments, the report is created by a report designer (e.g., report designer 112 of FIG. 1) and is used by a report user (e.g., report user 100 of FIG. 1), and the report designer is executed an application server (e.g., application server 104 of FIG. 1). In the example shown, in 500, an indication of a familiar data instance is received. The familiar data instance can be any instance the report creator is familiar with (e.g., himself, his location, a familiar vendor, etc.) of the class the report will include. In 502, a contextual reporting command is received. In some embodiments, contextual reporting is initiated by the report creator selecting contextual reporting from a menu of actions related to the currently viewed instance. In 504, a list of fields (e.g., class report fields 204 of FIG. 2) available to be used in the report is displayed. The displayed list of fields comprises the set of fields of the familiar data instance. In various embodiments, all of the fields of the familiar data instance are displayed, only the fields of the familiar data instance that the user has permission to see are displayed, only the fields of the familiar data instance that the user has permission to modify are displayed, only one of the fields of the familiar data instance are displayed, or any other appropriate subset of the fields of the familiar data instance are displayed. Only the fields of the familiar data instance need be displayed since the report comprises instances of the type of the familiar data instance. The list of fields is displayed along with associated values stored by the familiar data instance. Displaying the associated values helps the report creator select the fields to be included in the report by helping to distinguish fields that might otherwise be confused, and by indicating interesting data that might otherwise have been missed. In 506, a selection of fields to be used in the report is received.

In 508, a list of report data sources is displayed. The list of report data sources comprises a subset of the report data sources that can return the familiar data instance. In various embodiments, all of the report data sources that can return the familiar data instance are displayed, only the report data sources that can return the familiar data instance that the user has permission to create a report with are displayed, only one of the report data sources that can return the familiar data instance are displayed, or any other appropriate subset of the report data sources that can return the familiar data instance is displayed. In some embodiments, this list of report data sources will be reduced compared with the list of report data sources displayed in 402 of FIG. 4. In 510, a selection of a report data source to be used in the report is received. In 512, a report name is received. In some embodiments, the report user uses the name to identify the report.

In 514, report sorting rule(s) (e.g., report sorting rule(s) 206 of FIG. 2) are received. Report sorting rule(s) comprise a set of rules for sorting the rows of the report. In some embodiments, report sorting rule(s) comprise one or more predefined rules for sorting the rows of the report. In some embodiments, no report sorting rules are defined, and the rows of the report are sorted according to a default set of rules. In 516, report filtering rule(s) (e.g., report filtering rule(s) 208 of FIG. 2) are received. Report filtering rule(s) comprise a set of rules for filtering the rows of the report. In some embodiments, report filtering rule(s) comprise one or more predefined rules for filtering the rows of the report. In some embodiments, no report filtering rules are defined, and all rows of the report are displayed. In 518, report prompt(s) (e.g., report prompt(s) 210 of FIG. 2) are received. Report prompts comprise a set of prompts presented to the report user when the report is run, comprising parameters of the report filtering rules (e.g., display records after date, display employees with salary above what value, etc.). In some embodiments, one or more report prompts are defined and presented to the user when the report is run. In some embodiments, no report prompts are defined, and the report runs without any user input. In 520, a security policy (e.g., security policy 212 of FIG. 2) is received. The security policy comprises a policy defining which users are allowed to run the report. In various embodiments, the security policy comprises a set of users defined by a filter, an explicitly defined set of users, all users, no users, or any other appropriate set of users. In 522, the report is saved, and the process ends. For example, the defined report is saved. The saved defined report can be used by a user to generate a report with current or otherwise specified data.

Figure 6:
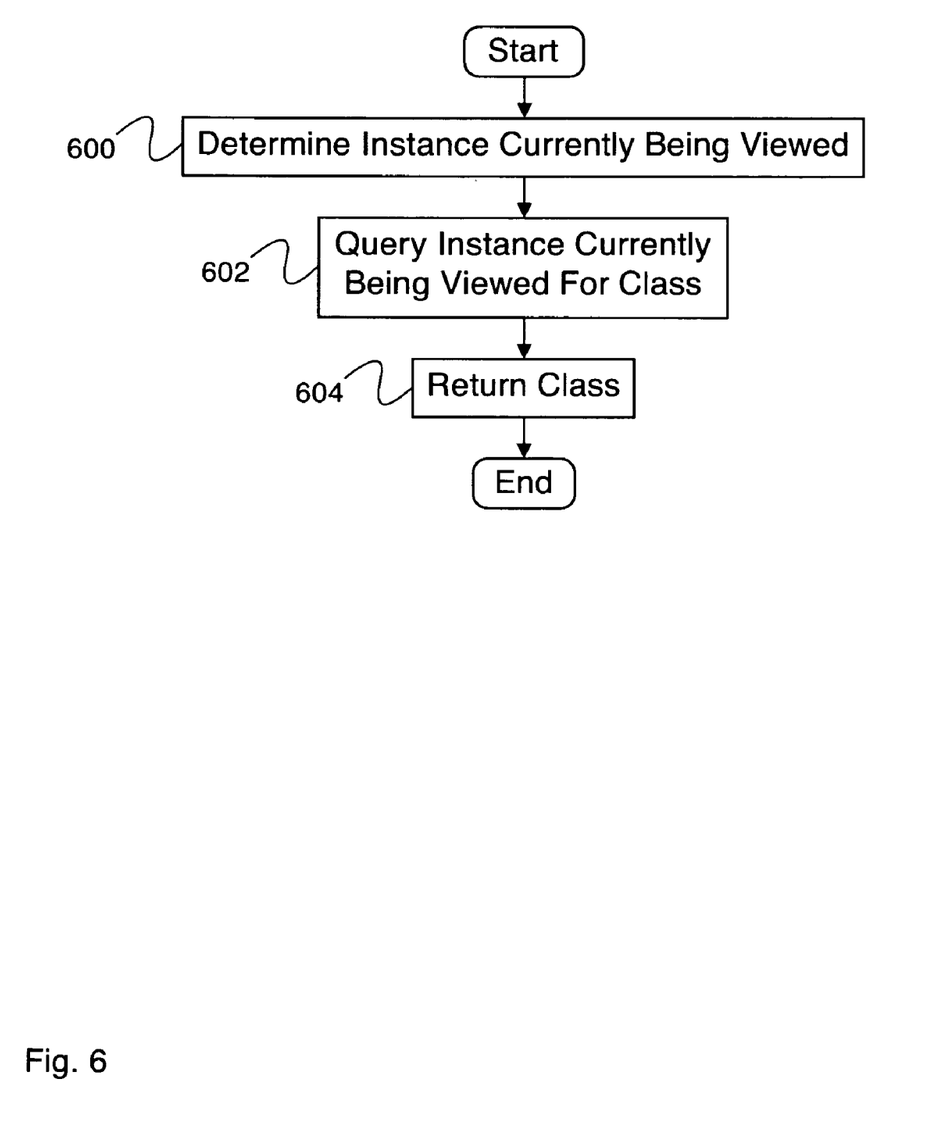
FIG. 6 is a flow diagram illustrating an embodiment of a process for determining the class of the currently viewed instance.

FIG. 6 is a flow diagram illustrating an embodiment of a process for determining the class of the currently viewed instance. In some embodiments, the process of FIG. 6 is used by the contextual report creator as part of determining the report data sources that can return the currently viewed instances in 510 of FIG. 5. In the example shown, in 600, the instance currently being viewed is determined. In 602, the instance currently being viewed is queried for its class. In some embodiments, the instance includes a get class method that is run and returns its class. In 604, the class is returned, and the process ends.

Figure 7:
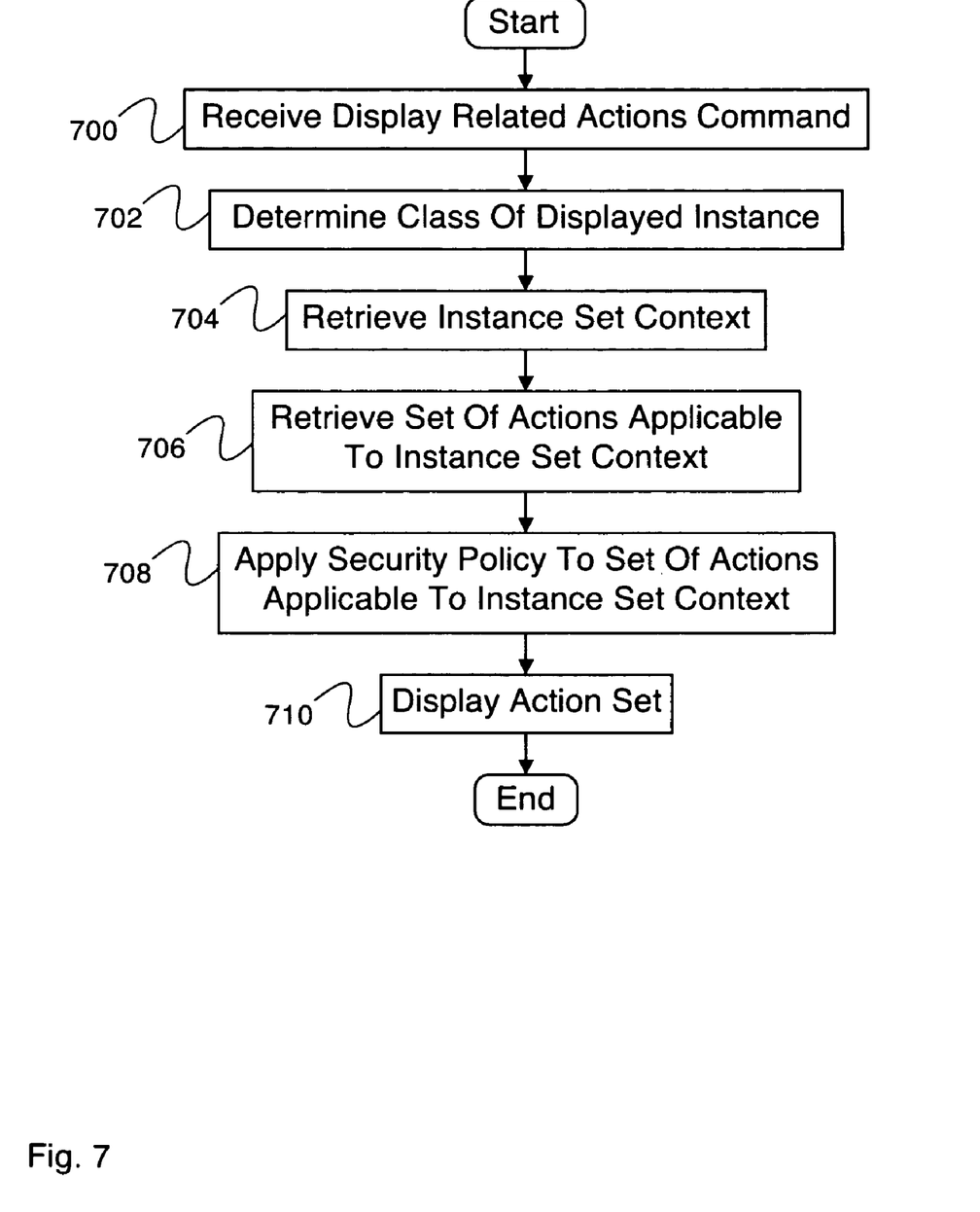
FIG. 7 is a flow diagram illustrating an embodiment of a process for responding to a display related actions command.

FIG. 7 is a flow diagram illustrating an embodiment of a process for responding to a display related actions command. In some embodiments, a set of related actions is determined and displayed when a user (e.g., report user 100 of FIG. 1 or report designer 112 of FIG. 1) clicks the display related actions icon. In the example shown, in 700, a display related actions command is received. In 702, the class of the displayed instance is determined. In some embodiments, the class of the displayed instance is determined using the process of FIG. 6. In 704, the instance set context is retrieved. An instance set is a set of instances defined in a particular way (e.g., my subordinate employees, all engineering managers, etc.), and the instance set context for a given instance is the set of all instance sets it can belong to. Each action a user might be able to take is defined to be available to a given instance set or set of instance sets. In 706, the set of actions applicable to the instance set context (e.g., available to any instance set within the instance set context) is determined. The set of actions applicable to the instance set context is determined by taking the union of the sets of actions available to each instance set in the instance set context. In 708, a security policy is applied to the set of actions applicable to the instance set context. In some embodiments, each action has a security policy defining which users have access to the action. When the security policy is applied to the set of actions applicable to the instance set context, the set of actions is narrowed to include only the set of actions applicable to the instance set context that the user has access to. In 710, the action set is displayed, and the process ends.

Figure 8:
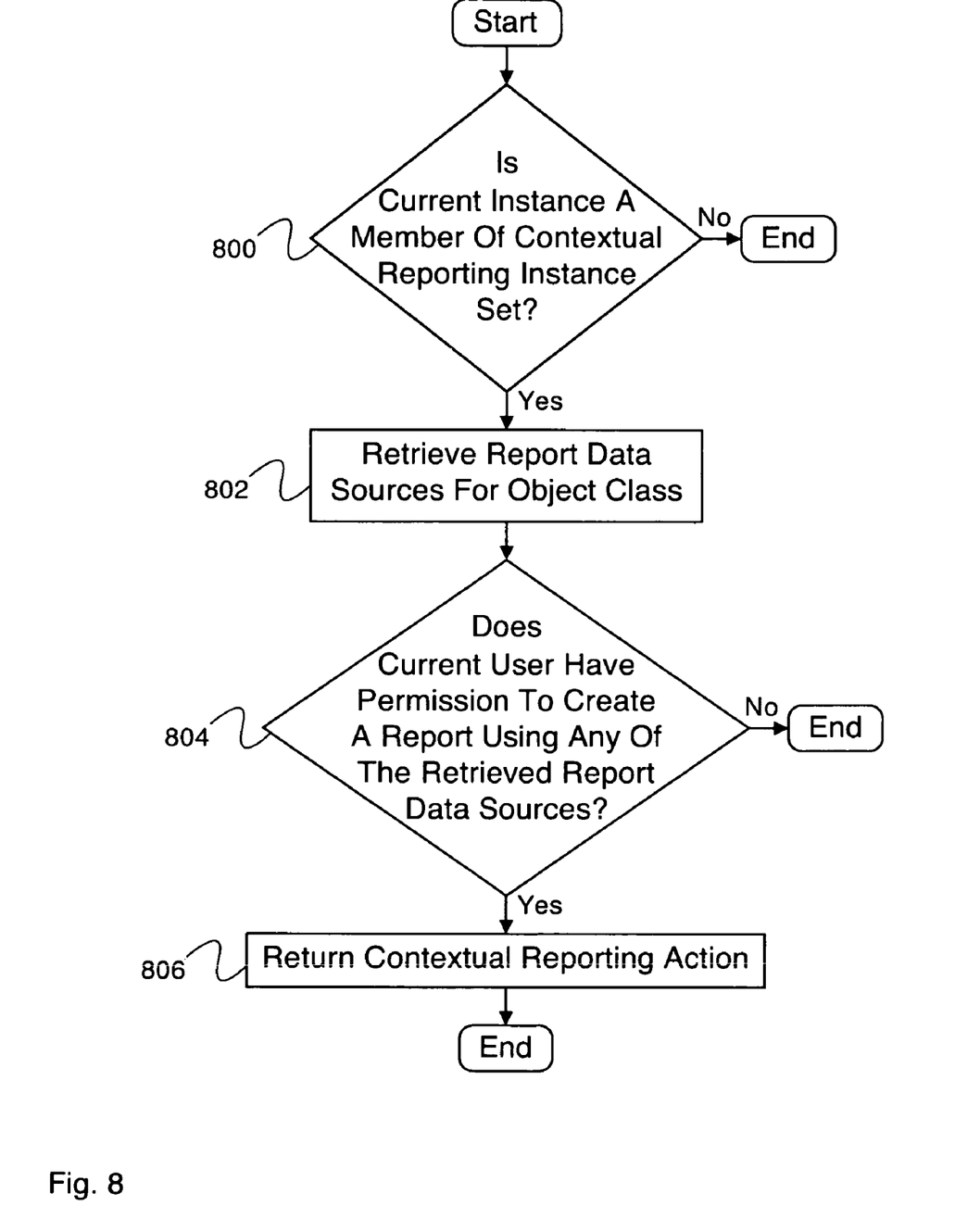
FIG. 8 is a flow diagram illustrating an embodiment of a process for determining if a contextual reporting action appears in a set of related actions.

FIG. 8 is a flow diagram illustrating an embodiment of a process for determining if a contextual reporting action appears in a set of related actions. In some embodiments, the contextual reporting action initiates a contextual report creator (e.g., the contextual report creator of FIG. 5). In some embodiments, the set of related actions is the set of related actions generated in FIG. 7. In the example shown, in 800, it is determined if the current instance is a member of the contextual reporting instance set. Contextual reporting is only available to the instance set context (e.g., in 706 of FIG. 7) if the current instance is a member of the contextual reporting instance set. If the current instance is not a member of the contextual reporting instance set, the process ends. If the current instance is a member of the contextual reporting instance set, control passes to 802. In 802, the report data sources for the object class of the current object are retrieved. In some embodiments, the security policy for the contextual reporting object is implemented separately for each report data source, e.g., a user may have permission to create a report using the non-salaried employees report data source but not the senior management report data source. In 804, it is determined if the current user has permission to create a report using any of the retrieved report data sources. If the current user does not have permission to create a report using any of the retrieved report data sources, the process ends. If the current user has permission to create a report using any of the retrieved report data sources, control passes to 806. In 806, the process returns the contextual reporting action, and the process ends.

Figure 9:
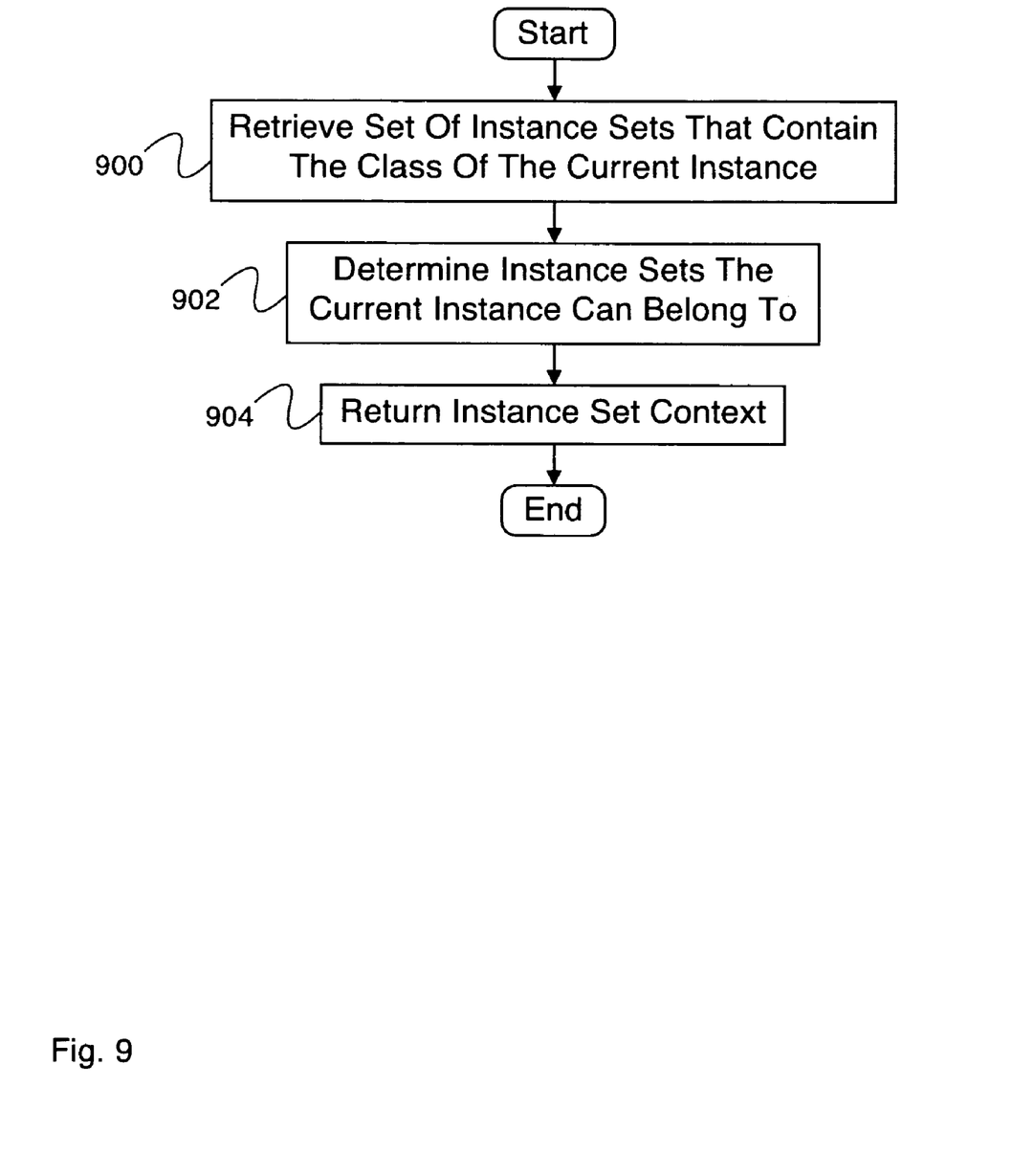
FIG. 9 is a flow diagram illustrating a process for retrieving an instance set context.

FIG. 9 is a flow diagram illustrating a process for retrieving an instance set context. In some embodiments, the process of FIG. 9 implements 704 of FIG. 7. In the example shown, in 900, the set of instance sets that contain the class of the current instance is retrieved. The class of the current instance is determined (e.g., by a process such as that of FIG. 6) and each instance set is checked to see whether it contains the class of the current instance, until the set of instance sets that contain the class of the current instance has been determined. In 902, the set of instance sets the current instance can belong to is determined. The set of instance sets retrieved in 900 is filtered to include only those sets that the current instance meets the criteria to belong to. The remaining set of instance sets comprises the instance set context. In 904, the process returns the instance set context, and the process ends.

Figure 10:
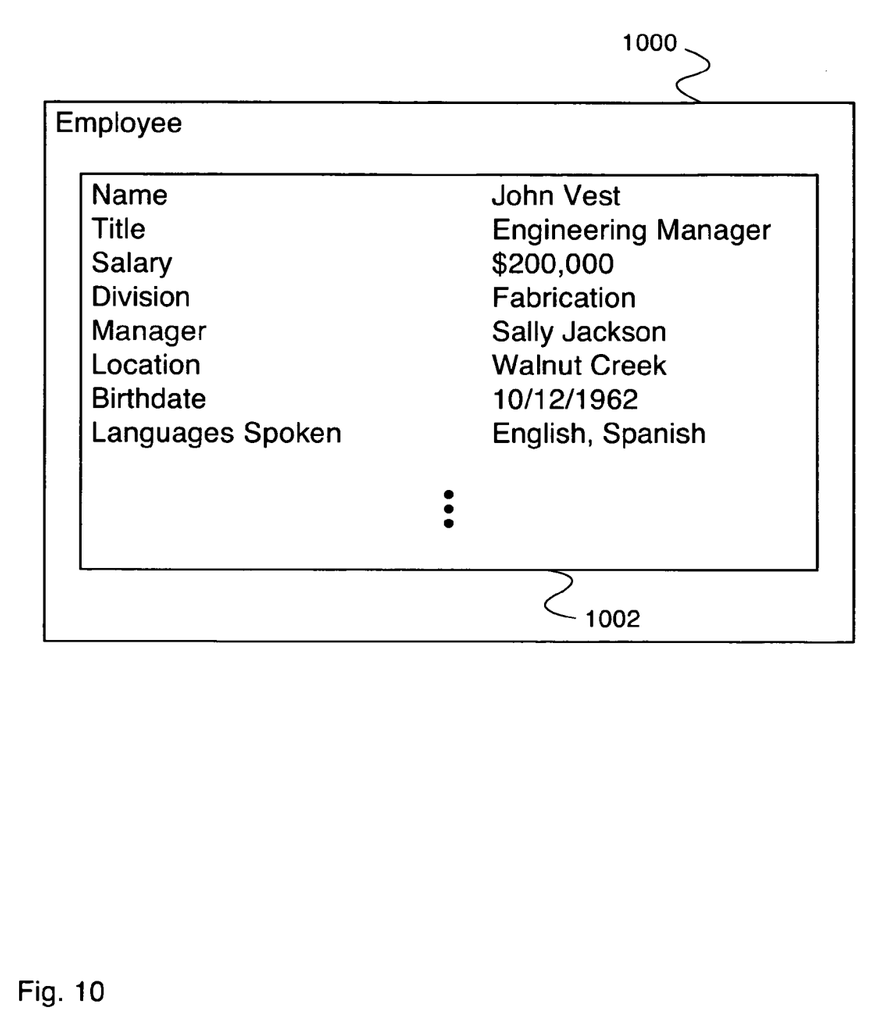
FIG. 10 is a diagram illustrating an embodiment of an instance of the employee class.

FIG. 10 is a diagram illustrating an embodiment of an instance of the employee class. In the example shown, instance of employee object 1000 comprises set of class report fields and values 1002. In the example shown, set of class report fields and values comprises class report fields Name, Title, Salary, Division, Manager, Location, Birthdate, and Languages Spoken. In various embodiments, only some of these class report fields are used or any other appropriate class report fields are used.

Figure 11:
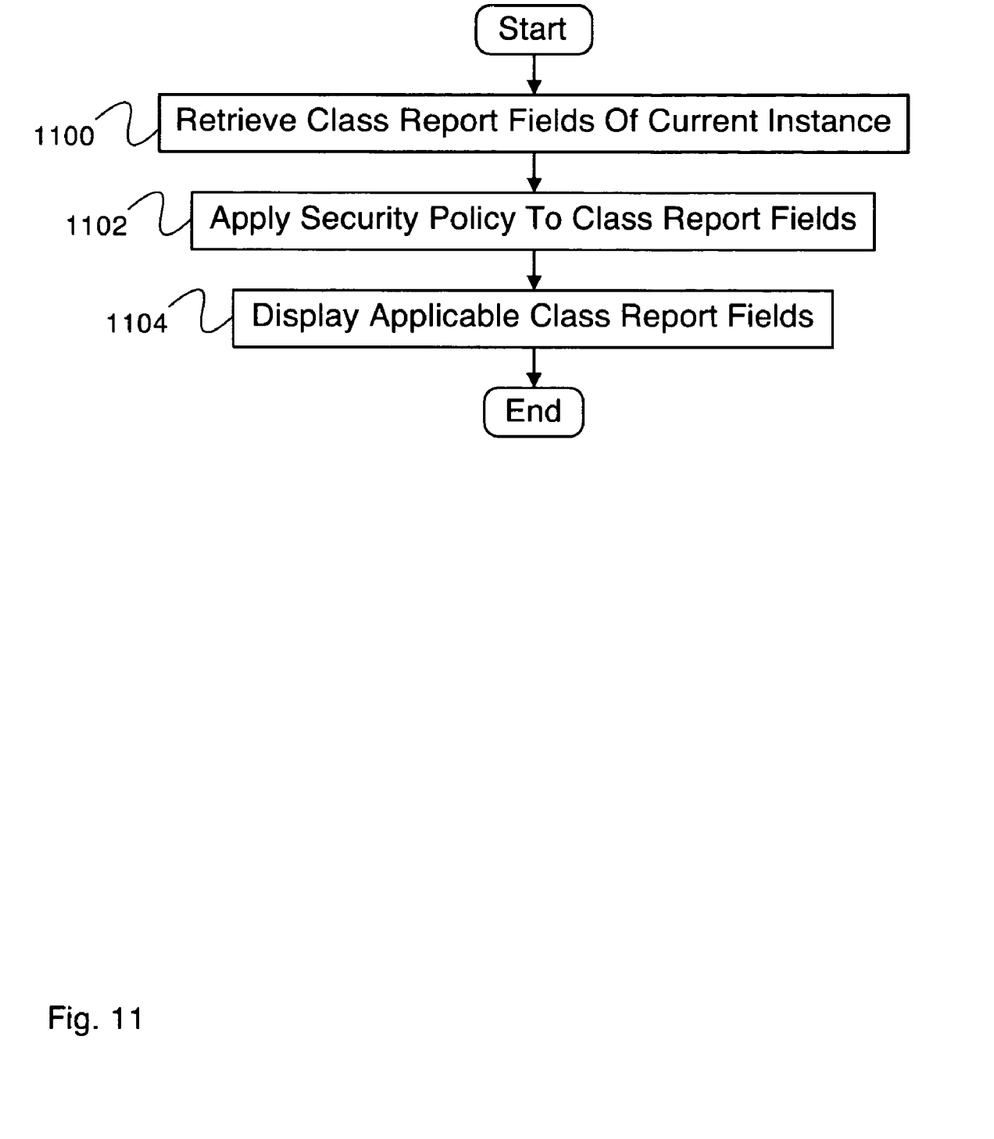
FIG. 11 is a flow diagram illustrating an embodiment of a process for determining what fields to display to a report creator during contextual report creation.

FIG. 11 is a flow diagram illustrating an embodiment of a process for determining what fields to display to a report creator during contextual report creation. In some embodiments, the contextual report creator uses the process of FIG. 11 to determine what fields to display after contextual reporting has been initiated (e.g., in 502 of FIG. 5). In the example shown, in 1100, the class report fields of the current instance are retrieved. In 1102, the security policy is applied to the class report fields retrieved in 1100. Any class report fields that the security policy indicates the current user is not allowed to view are discarded from the set of class report fields retrieved in 1100. In 1104, the applicable class report fields are displayed to the user, and the process ends.

Figure 12:
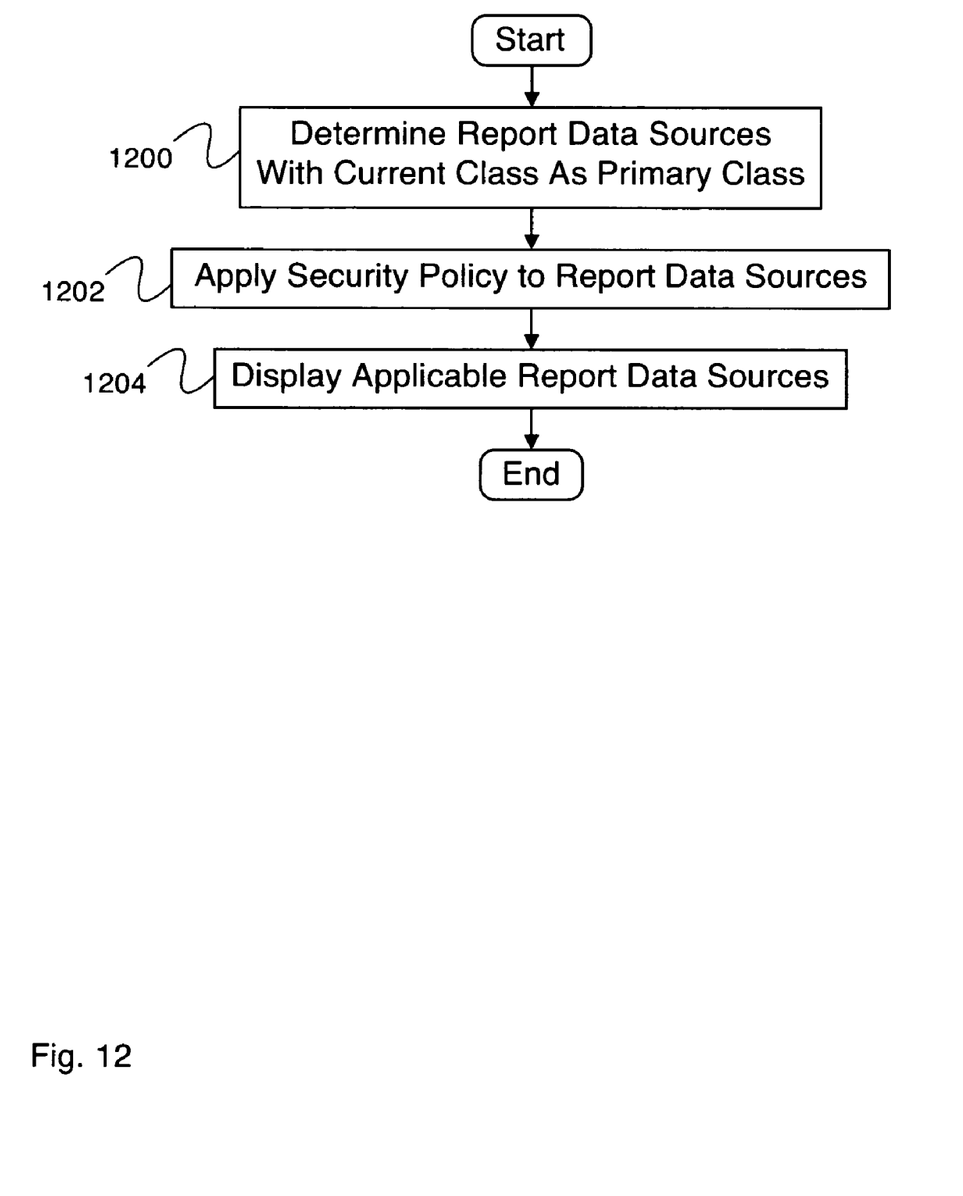
FIG. 12 is a flow diagram illustrating an embodiment of a process for determining what report data sources to display to a report creator during contextual report creation.

FIG. 12 is a flow diagram illustrating an embodiment of a process for determining what report data sources to display to a report creator during contextual report creation. In some embodiments, the contextual report creator uses the process of FIG. 12 to determine what report data sources to present as choices to the report creator when choosing a report data source (e.g., in 510 of FIG. 5). In the example shown, in 1200, the report data sources with the current class as the primary class are retrieved. In 1202, the security policy is applied to the report data sources retrieved in 1200. Any report data sources that the security policy indicates the current user is not allowed to create a report with are discarded from the set of class report fields retrieved in 1200. In 1204, the applicable report data sources are displayed to the user, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for defining a report, comprising:
a processor configured to:
receive an indication of a data instance of a class type;
retrieve a set of class report fields associated with the data instance, wherein the set of class report fields comprises a set of class report fields available to be used in a report;
determine the class type of the data instance;
retrieve a set of report data sources based at least in part on the determined class type, wherein the set of report data sources is associated with one or more class report fields selected from the set of class report fields associated with the data instance;
define the report using a selected report data source from the set of report data sources; and
a memory coupled to the processor and configured to provide the processor with instructions.

2. A system as in claim 1, wherein retrieving the set of fields comprises retrieving the set of fields from a storage device or memory using a processor.

3. A system as in claim 1, wherein retrieving the set of report data sources comprises retrieving the set of fields from a storage device or memory using a processor.

4. A system as in claim 1, wherein the processor is further configured to receive one or more report sorting rules.

5. A system as in claim 1, wherein the processor is further configured to receive one or more report filtering rules.

6. A system as in claim 5, wherein the filtering rules automatically filter the data instance by content of the report data source.

7. A system as in claim 1, wherein the processor is further configured to receive one or more report prompts.

8. A system as in claim 1, wherein the processor is further configured to receive a report security policy.

9. A system as in claim 1, wherein the set of fields associated with the received indication of the data instance are displayed along with the values stored in each field in order to aid in the selection of the one or more fields.

10. A system as in claim 9, wherein the displayed set of fields comprises all of the fields of the data instance.

11. A system as in claim 9, wherein the displayed set of fields comprises the fields of the data instance that the user has permission to view.

12. A system as in claim 1, wherein the set of report data sources are displayed in order to aid in the selection of the selected report data source.

13. A system as in claim 12, wherein the displayed set of report data sources comprises all of the report data sources that return the data instance.

14. A system as in claim 12, wherein the displayed set of report data sources comprises the report data sources that return the data instance with which a user has permission to create a report.

15. A system as in claim 1, further comprising a storage device, wherein the defined report is saved on the storage device.

16. A system as in claim 1, wherein each of the one or more selected fields appears as a column in the report when executed.

17. A system as in claim 1, wherein the set of class report fields comprises at least one of class report fields Name, Title, Salary, Division, Manager, Location, Birthdate, and Languages Spoken.

18. A method executed by a processor for defining a report, comprising:
  receiving an indication of a data instance of a class type;
  retrieving a set of class report fields associated with the data instance, wherein the set of class report fields comprises a set of class report fields available to be used in a report;
  determining, using a processor, the class type of the data instance;
  retrieving a set of report data sources based at least in part on the determined class type, wherein the set of report data sources is associated with one or more class report fields selected from the set of class report fields associated with the data instance; and
  defining the report using a selected report data source from the set of report data sources.

19. A method as in claim 18, wherein retrieving the set of fields comprises retrieving the set of fields from a storage device or memory using a processor.

20. A method as in claim 18, wherein retrieving the set of report data sources comprises retrieving the set of fields from a storage device or memory using a processor.

21. A method as in claim 18, further comprising receiving one or more report sorting rules.

22. A method as in claim 18, further comprising receiving one or more report filtering rules.

23. A method as in claim 22, wherein the filtering rules automatically filter the data instance by content of the report data source.

24. A method as in claim 18, further comprising receiving one or more report prompts.

25. A method as in claim 18, further comprising receiving a report security policy.

26. A method as in claim 18, wherein the set of fields associated with the received indication of the data instance are displayed along with the values stored in each field in order to aid in the selection of the one or more fields.

27. A method as in claim 26, wherein the displayed set of fields comprises all of the fields of the data instance.

28. A method as in claim 26, wherein the displayed set of fields comprises the fields of the data instance that the user has permission to view.

29. A method as in claim 18, wherein the set of report data sources are displayed in order to aid in the selection of the selected report data source.

30. A method as in claim 29, wherein the displayed set of report data sources comprises all of the report data sources that return the data instance.

31. A method as in claim 29, wherein the displayed set of report data sources comprises the report data sources that return the data instance with which a user has permission to create a report.

32. A method as in claim 18, wherein the defined report is saved using a storage device.

33. A computer program product for defining a report, the computer program product being embodied in a non-transitory computer readable medium and comprising computer instructions for:
  receiving an indication of a data instance of a class type;
  retrieving using a processor a set of class report fields associated with the data instance, wherein the set of class report fields comprises a set of class report fields available to be used in a report;
  determining the class type of the data instance retrieving using a processor a set of report data sources based at least in part on the determined class type, wherein the set of report data sources is associated with one or more class report fields selected from the set of fields associated with the data instance; and
  defining the report using a selected report data source from the set of report data sources.

* * * * *